S. S. MILES.
Manufacture of Pruning-Shears.
No. 164,579.  Patented June 15, 1875.
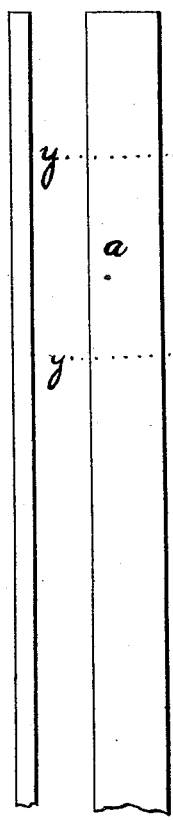
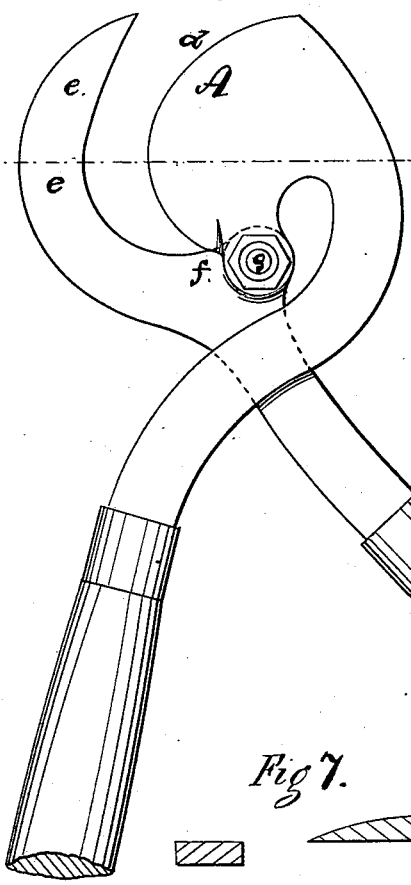
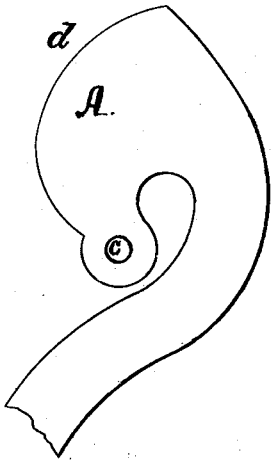
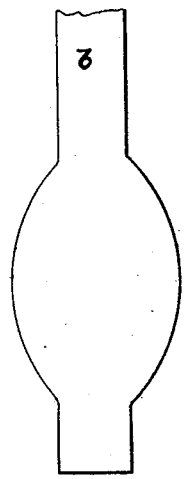
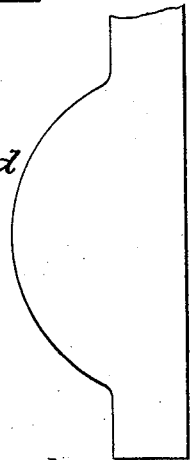
Witnesses
W. M. Edwards
B. S. Clark
Inventor
Stephen S. Miles
per J. P. Fitch
his Atty.

UNITED STATES PATENT OFFICE.

STEPHEN S. MILES, OF ROME, NEW YORK.

IMPROVEMENT IN THE MANUFACTURE OF PRUNING-SHEARS.

Specification forming part of Letters Patent No. 164,579, dated June 15, 1875; application filed February 10, 1875.

*To all whom it may concern:*

Be it known that I, STEPHEN S. MILES, of Rome, in the county of Oneida, State of New York, have invented an Improvement in the Art of Fabricating Pruning-Shears, of which the following is a specification, reference being had to the accompanying drawings forming part of the same, in which—

Figure 1 is a side view of a bar of steel, of which the cutting-blade of pruning-shears is made by my method. Fig. 2 is an edge view of the same. Fig. 3 is a side view of the same bar after it has undergone the first step in my process, namely, the upsetting of the portion of the bar that is to constitute the cutting-blade. Fig. 4 is a similar view of the same bar after the enlargement caused by the upsetting has been caused to project wholly on that edge of the bar designed to be the cutting-blade. Fig. 5 is a side view of the same bar after being curved and formed into the shape which fits it to become the cutting-blade and shank of a pair of pruning-shears. Fig. 6 is a side view of a pair of completed pruning-shears fabricated according to my improved method; and Fig. 7 is a section on the line $x\ x$, Fig. 6.

My invention relates to pruning-shears having a single cutting-blade with an opposing jaw, designed to press the object to be cut against the cutting-edge of the cutting-blade, the blade and jaw operating to accomplish what is known as a "draw-cut;" and consists in the improvement in the art of fabricating such shears, hereinafter particularly described.

In practicing my improvement I take, for medium-sized shears, a bar of steel, Figs. 1 and 2, measuring, in cross-section, say, one and a quarter inch by five-sixteenths of an inch, and of suitable length to form the blade and shank. The portion $a$ of this bar, intended for the cutting-blade, will be about between the dotted lines $y\ y$, Fig. 1. This portion I heat and upset by any suitable means, so as to increase its size, as represented by Fig. 3, leaving the end $b$ the original size of the bar.

A practicable method of effecting the said upsetting of the portion of the bar indicated is to heat the said portion, applying the heat as near its center as possible; then to plunge the end $b$ for a moment in cold water; then to grasp the bar on the opposite side of the line $y\ y$ in a vise, when, by blows of a hammer on the end $b$, the portion between $x$ and $y$ will be upset and increased in size, as shown in Fig. 3. Any other convenient method of manipulation may be practiced to effect the upsetting of the bar.

The enlargement formed by the upsetting I then cause to project wholly on one edge of the bar, as seen in Fig. 4, preserving the original thickness of the bar uniform throughout. This may be done by placing the upset portion edgewise down upon a properly-formed swage, and striking with a hammer the opposite or upper edge over the swage, so as to carry the swell in the bar wholly down into the swage, giving it the form shown in Fig. 4. This bar I then bend into the form represented by Fig. 5, and make an aperture, $c$, in the end $b$ for the pivot of the shears, and bevel-draw the curved edge $d$ down to a cutting-edge, which will, of course, give the cutting-blade A increased breadth, as represented in the completed shears, Fig. 6.

The opposing jaw $e$, with its shank $f$, may also be made from a bar of steel of a suitable size for the said shank, by upsetting that portion designed for the pivotal center $g$, as that portion is made to project some distance inwardly from the axial line of the bar, to enable the jaw $e$ to extend laterally beyond and curve around the cutting-edge $d$ of the blade A. The two halves of the shears are then put together with a proper screw, pin, or rivet, as seen in Fig. 6.

The obvious advantage of this improved method of fabricating the cutting-blade and shank of the shears described is its great saving of labor and expense; also, the obviating of the weakening of the shank which occurs when, as in the ordinary method of constructing shears, the aperture for the pivot is made in the body or shank between the handle and the cutting-blade; and it is to the special method described of fabricating the cutting-blades of pruning-shears, designed to accomplish a draw-cut, by a curved cutting-edge against which the object to be cut is forced by a jaw, between which and the pivot of the shears is the cutting-edge, and the shears thus constituted, that I limit my claim.

What I do claim, and desire to secure by Letters Patent, is—

The improvements in the art of fabricating pruning-shears herein described, consisting in commencing the fabrication of the cutting-blade, with its shank and pivotal portion, from a bar of steel of suitable size for the said shanks, upsetting and spreading the same to form the blade A, making the aperture for the pivot $c$ in the end $b$ of the bar, binding the bar thus fashioned into the form shown in Fig. 5, and uniting the same to the other half of the shears, thus forming the instrument shown in Fig. 6, substantially as specified.

STEPHEN S. MILES.

Witnesses:
A. S. FITCH,
FRED. BOND.